US011957636B2

(12) United States Patent
Hyung et al.

(10) Patent No.: US 11,957,636 B2
(45) **Date of Patent: *Apr. 16, 2024**

(54) ASSISTING TORQUE SETTING METHOD AND APPARATUS

(71) Applicant: Samsung Electronics Co., Ltd., Suwon-si (KR)

(72) Inventors: Seungyong Hyung, Yongin-si (KR); Youngbo Shim, Seoul (KR); Sunghwan Ahn, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 540 days.

This patent is subject to a terminal disclaimer.

(21) Appl. No.: 17/003,335

(22) Filed: Aug. 26, 2020

(65) Prior Publication Data

US 2020/0390637 A1 Dec. 17, 2020

Related U.S. Application Data

(63) Continuation of application No. 14/697,839, filed on Apr. 28, 2015, now Pat. No. 10,786,416.

(30) Foreign Application Priority Data

Nov. 26, 2014 (KR) ........................ 10-2014-0166234

(51) Int. Cl.
*A61H 3/00* (2006.01)
*A61H 1/02* (2006.01)

(52) U.S. Cl.
CPC ............. *A61H 3/00* (2013.01); *A61H 1/0244* (2013.01); *A61H 2201/1215* (2013.01);
(Continued)

(58) Field of Classification Search
CPC .... A61H 1/02; A61H 2001/0203–0211; A61H 1/0237–0244; A61H 3/00;
(Continued)

(56) References Cited

U.S. PATENT DOCUMENTS 7,175,604 B2 2/2007 Cole
7,756,585 B2 7/2010 Embrey et al.
(Continued)

FOREIGN PATENT DOCUMENTS

JP 2004-073649 A 3/2004
JP 2010063813 A 3/2010
(Continued)

OTHER PUBLICATIONS

Extended European Search Report dated Apr. 11, 2016 for Application No. EP 15168671.4.
(Continued)

*Primary Examiner* — Rachel T Sippel
(74) *Attorney, Agent, or Firm* — Harness, Dickey & Pierce, P.L.C.

(57) ABSTRACT

An assisting torque setting apparatus and method, wherein the apparatus is configured to generate a reference gait model by applying body information of a user to a predetermined body model, and set an optimal assisting torque by adjusting an assisting torque provided from a walking assistance apparatus to the user based on the reference gait model is disclosed.

17 Claims, 15 Drawing Sheets

(52) U.S. Cl.
CPC ................ *A61H 2201/1628* (2013.01); *A61H 2201/164* (2013.01); *A61H 2201/165* (2013.01); *A61H 2201/501* (2013.01); *A61H 2201/5064* (2013.01); *A61H 2201/5069* (2013.01); *A61H 2201/5079* (2013.01); *A61H 2201/5084* (2013.01); *A61H 2201/5097* (2013.01); *A61H 2230/085* (2013.01); *A61H 2230/605* (2013.01); *A61H 2230/625* (2013.01)

(58) Field of Classification Search
CPC ........ A61H 2003/001; A61H 2003/007; A61H 2201/0173–018; A61H 2201/12–1246; A61H 2201/1671; A61H 2201/1628–163; A61H 2201/1676; A61H 2201/5061–5069; A61H 2201/5084; A61H 2205/102; A61H 2205/106–108; A61F 5/01–0102; A61F 5/0123–0125; A61F 2005/0132–0179
See application file for complete search history.

(56) References Cited

U.S. PATENT DOCUMENTS

| | | | | |
|---|---|---|---|---|
| 8,096,965 | B2 | 1/2012 | Goffer et al. | |
| 2006/0046909 | A1 | 3/2006 | Rastegar et al. | |
| 2008/0277943 | A1 | 11/2008 | Donelan et al. | |
| 2009/0043357 | A1 | 2/2009 | Tong et al. | |
| 2009/0299480 | A1 | 12/2009 | Gilbert et al. | |
| 2011/0288453 | A1 | 11/2011 | Endo | |
| 2012/0259431 | A1 | 10/2012 | Han et al. | |
| 2012/0271207 | A1* | 10/2012 | Schoen ................. | A61F 5/0102 601/34 |
| 2012/0283844 | A1 | 11/2012 | Langlois | |
| 2013/0310979 | A1 | 11/2013 | Herr et al. | |
| 2014/0088727 | A1 | 3/2014 | Han et al. | |
| 2014/0121574 | A1 | 5/2014 | Chladek | |
| 2014/0121575 | A1 | 5/2014 | Yasuhara et al. | |
| 2014/0276273 | A1* | 9/2014 | Leismer ............. | A63B 23/0405 601/49 |
| 2014/0330431 | A1 | 11/2014 | Hollander et al. | |
| 2017/0202724 | A1* | 7/2017 | De Rossi ................. | A61H 3/00 |
| 2018/0008502 | A1 | 1/2018 | Asbeck et al. | |

FOREIGN PATENT DOCUMENTS

| | | | |
|---|---|---|---|
| JP | 2013-013579 | A | 1/2013 |
| JP | 5315504 | B2 | 10/2013 |
| JP | 2016-097300 | A | 5/2016 |
| KR | 10-1131972 | B1 | 3/2012 |
| KR | 10-1307223 | B1 | 9/2013 |
| KR | 10-2014-0070064 | A | 6/2014 |
| WO | WO-2012/100250 | A1 | 7/2012 |

OTHER PUBLICATIONS

*Notice of Allowance issued by the KIPO dated Jun. 23, 2020 in KR Application No. 10-2014-0166234 corresponding to EP 15168671.*
Japanese Office Action dated Jan. 5, 2021 for corresponding Japanese Application No. 2019-224593.

* cited by examiner

ASSISTING TORQUE SETTING METHOD AND APPARATUS

CROSS-REFERENCE TO RELATED APPLICATION

This application is a continuation of U.S. application Ser. No. 14/697,839, filed on Apr. 28, 2015, which claims the priority benefit of Korean Patent Application No. 10-2014-0166234, filed on Nov. 26, 2014, in the Korean Intellectual Property Office, the entire contents of each of which are incorporated herein by reference in its entirety.

BACKGROUND

1. Field

Example embodiments relate to an assisting torque setting method and/or an apparatus performing the same.

2. Description of the Related Art

With the onset of rapidly aging societies, many people may experience inconvenience and pain from joint problems, and interest in walking assistance apparatuses enabling the elderly or patients with joint problems to walk with less effort, may therefore increase. Furthermore, walking assistance apparatuses for intensifying muscular strength of human bodies may be useful for military purposes.

In general, walking assistance apparatuses may include body frames disposed on trunks of a user, pelvic frames coupled to lower sides of the body frames to cover pelvises of the user, femoral frames disposed on thighs of the user, sural frames disposed on calves of the user, and/or pedial frames disposed on feet of the user. The pelvic frames and femoral frames may be connected rotatably by hip joint portions, the femoral frames and sural frames may be connected rotatably by knee joint portions, and/or the sural frames and pedial frames may be connected rotatably by ankle joint portions.

However, in conventional walking assistance apparatuses, the assistance torque provided to the user may not be based on the body characteristics of the user.

SUMMARY

Some example embodiments relate to an assisting torque setting apparatus.

In some example embodiments, the assisting torque setting apparatus may include a body information extractor configured to extract body information on a user, a reference gait model generator configured to generate a reference gait model by applying the body information to a predetermined body model, and an assisting torque setter configured to set an optimal assisting torque by adjusting an assisting torque provided from a walking assistance apparatus to the user based on the reference gait model.

The body information may include at least one of joint information, muscle information, and nerve information on the user.

The body information extractor may be configured to extract the joint information using at least one of a motion capturing apparatus and a force plate apparatus.

The assisting torque setter may be configured to extract an energy used for a gait of the user by calculating a metabolic cost of transport (MCOT), and adjust the assisting torque based on the extracted energy.

The assisting torque setter may be configured to calculate the MCOT based on a force used in a muscle of the user during the gait, a moving velocity of the muscle, a moving distance of the user, and a mass of the muscle.

The assisting torque setter may be configured to generate an initial assisting torque profile indicating a trajectory of the assisting torque changing based on a predetermined period of time by using the reference gait model, and extract an optimal assisting torque profile for minimizing the MCOT by adjusting the trajectory.

The assisting torque setter may be configured to adjust the trajectory to reduce the MCOT until minimized.

The assisting torque setter may be configured to extract a variation of the MCOT in response to the adjusting of the trajectory.

The assisting torque setter may be configured to extract the optimal assisting torque profile based on a dynamic programming or a rapidly-exploring random tree (RRT).

The assisting torque setter may be configured to extract, based on the reference gait model, an optimal gain minimizing the MCOT by adjusting a gain of a driving portion in the walking assistance apparatus outputting an assisting torque corresponding to at least one of a hip-joint angle and a hip-joint angular velocity of the user.

The assisting torque setter may be configured to measure at least one of the hip-joint angle and the hip-joint angular velocity in real time.

The assisting torque setter may be configured to adjust the gain to reduce the MCOT until minimized.

The assisting torque setter may be configured to extract a variation of the MCOT in response to the adjusting of the gain.

The assisting torque setter may be configured to extract the optimal gain based on a Newton method.

The assisting torque setter may be configured to extract the optimal gain in response to the measured hip-joint angle or hip-joint angular velocity being beyond a predetermined threshold range based on a hip-joint angle or a hip-joint angular velocity corresponding to the optimal assisting torque profile.

Other example embodiments relate to a walking assistance apparatus.

In some example embodiments, the walking assistance apparatus may include a receiver configured to receive, from an external source, a reference gait model generated by applying body information on a user to a predetermined body model, and an assisting torque setter configured to set an optimal assisting torque by adjusting an assisting torque provided from the walking assistance to the user based on the reference gait model.

The walking assistance apparatus may further include a selector configured to select one of a first operation mode of providing the assisting torque to the user and a second operation mode of setting the optimal assisting torque, and the assisting torque setter may be configured to set the optimal assisting torque in response to the second operation mode selected by the selector.

The assisting torque setter may be configured to extract an energy used for a gait of the user by calculating an MCOT, and adjust the assisting torque based on the extracted energy.

The assisting torque setter may be configured to calculate the MCOT based on a force used in a muscle of the user during the gait, a moving velocity of the muscle, a moving distance of the user, and a mass of the muscle.

The assisting torque setter may be configured to generate an initial assisting torque profile indicating a trajectory of the assisting torque changing based on a predetermined period of time by using the reference gait model, and extract an optimal assisting torque profile for minimizing the MCOT by adjusting the trajectory.

The assisting torque setter may be configured to extract, based on the reference gait model, an optimal gain minimizing the MCOT by adjusting a gain of a driving portion in the walking assistance apparatus outputting an assisting torque corresponding to at least one of a hip-joint angle and a hip-joint angular velocity of the user.

The assisting torque setter may be configured to measure at least one of the hip-joint angle and the hip-joint angular velocity in real time.

The assisting torque setter may be configured to extract the optimal gain in response to the measured hip-joint angle or hip-joint angular velocity being beyond a predetermined threshold range based on a hip-joint angle or a hip-joint angular velocity corresponding to the optimal assisting torque profile.

Other example embodiments relate to an assisting torque setting method.

In some example embodiments, the assisting torque setting method may include extracting body information on a user, generating a reference gait model by applying the body information to a predetermined body model, and setting an optimal assisting torque by adjusting an assisting torque provided from a walking assistance apparatus to the user based on the reference gait model.

Other example embodiments relate to an assisting torque setting method.

In some example embodiments, the assisting torque setting method may include receiving, from an external source, a reference gait model generated by applying body information on a user to a predetermined body model, and setting an optimal assisting torque by adjusting an assisting torque provided from the walking assistance to the user based on the reference gait model.

Some example embodiments relate to a walking assistance apparatus configured to worn by a user thereof.

In some example embodiments, the walking assistance apparatus includes an assistance device configured to be worn on a leg of the user; a driver configured to generate an assistance torque to drive the assistance device; and a controller configured to determine the assistance torque based on a reference gait model, the reference gait model modeling a gait of the user based on body information associated with the user.

In some example embodiments, the body information indicates characteristics of one or more of joints, muscles and nerves of the user.

In some example embodiments, the controller is configured to generate the reference gait model by applying the body information associated with the user to a generic body model.

In some example embodiments, the controller is configured to receive the reference gait model from a server.

In some example embodiments, the controller is configured to determine the assistance torque based on an amount of metabolic energy exerted by the user when the user walks.

In some example embodiments, the controller is configured to determine the amount of metabolic energy exerted by the user based on a force used in a muscle of the user during the gait, a moving velocity of the muscle, a moving distance of the user, and a mass of the muscle.

In some example embodiments, the controller is configured to determine the assistance torque such that the assistance torque minimizes the amount of metabolic energy exerted by the user.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1A:
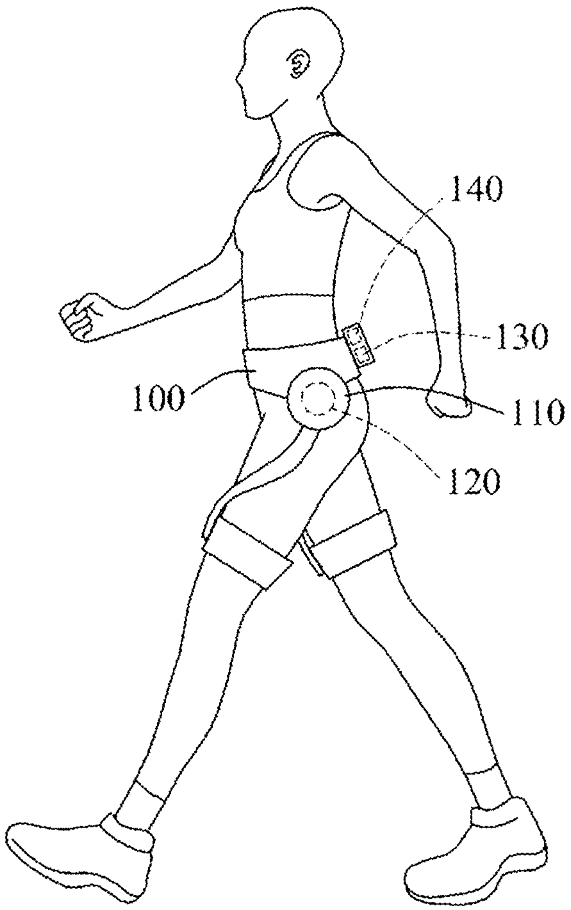
FIGS. 1A and 1B illustrate examples of a walking assistance apparatus according to example embodiments.

Hereinafter, some example embodiments will be described in detail with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular example embodiments only and is not intended to be limiting of the example embodiments. For example, it will be understood that, although the terms first, second, etc. may be used herein to describe various elements, these elements should not be limited by these terms.

These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1B:
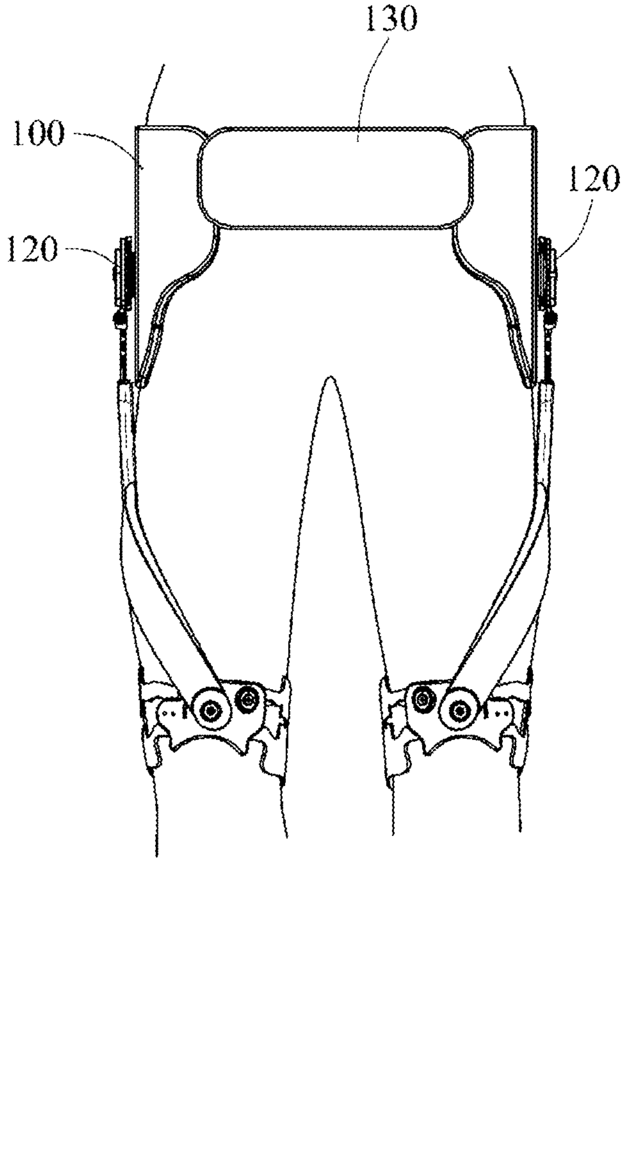

FIGS. 1A and 1B illustrate examples of a walking assistance apparatus 100 according to example embodiments.

Referring to FIGS. 1A and 1B, the walking assistance apparatus 100 includes a driving portion 110, a sensor portion 120, an inertial measurement unit (IMU) sensor 130, and a controller 140. Although FIGS. 1A and 1B illustrate a hip-type walking assistance apparatus, the type of the walking assistance apparatus is not limited thereto. For example, in other example embodiments, the walking assistance apparatus may be applicable to, for example, a walking assistance apparatus that supports an entire pelvic limb, a walking assistance apparatus that supports a portion of a pelvic limb, etc. The walking assistance apparatus that supports a portion of a pelvic limb may be applicable to, for example, a walking assistance apparatus providing support up to a knee, and a walking assistance apparatus providing support up to an ankle.

The driving portion 110 may be disposed on each of a left hip portion and a right hip portion of a user to drive both hip joints of the user.

The sensor portion 120 may measure hip joint angle information of both of the hips of the user while the user is walking. The hip joint angle information sensed by the sensor portion 120 may include at least one of angles of both hip joints, a difference between the angles of both hip joints, and motion directions of both hip joints. In an example, the sensor portion 120 may be disposed internally to the driving portion 110.

In another example embodiment, the sensor portion 120 may include a potentiometer. The potentiometer may sense at least one of variations of R-axial and L-axial joint angular velocities and variations of R-axial and L-axial joint angles based on a gait motion of the user.

The IMU sensor 130 may measure acceleration information and posture information while the user is walking. For example, the IMU sensor 130 may sense at least one of variations of X-axial, Y-axial, and Z-axial angular velocities and variations of X-axial, Y-axial, and Z-axial accelerations based on the gait motion of the user. A landing point in time of a foot of the user may be detected based on the acceleration information measured by the IMU sensor 130. When a sensor to detect a landing point in time of a foot is included in the walking assistance apparatus 100, the IMU sensor 130 may not be provided to recognize the gait motion.

Also, the walking assistance apparatus 100 may include other sensors, for example, an electrocardiogram (ECG) sensor, to sense a change in a biosignal or an exercise amount of the user based on the gait motion as well as the sensor portion 120 and the IMU sensor 130.

The controller 140 may control the driving portion 110 to output an assisting power, for example, an assisting torque, for assisting the user to walk. For example, a hip-type walking assistance apparatus may include two driving portions including the driving portion 110. The controller 140 may output a control signal to the driving portion 110 such that the driving portion 110 outputs an assisting torque corresponding to the driving portion 110. Based on the control signal output from the controller 140, the driving portion 110 may drive the hip joints of the user suitably for the recognized gait motion by outputting the assisting torque. In this example, the assisting torque may be set by an external source or by the controller 140.

Figure 2:
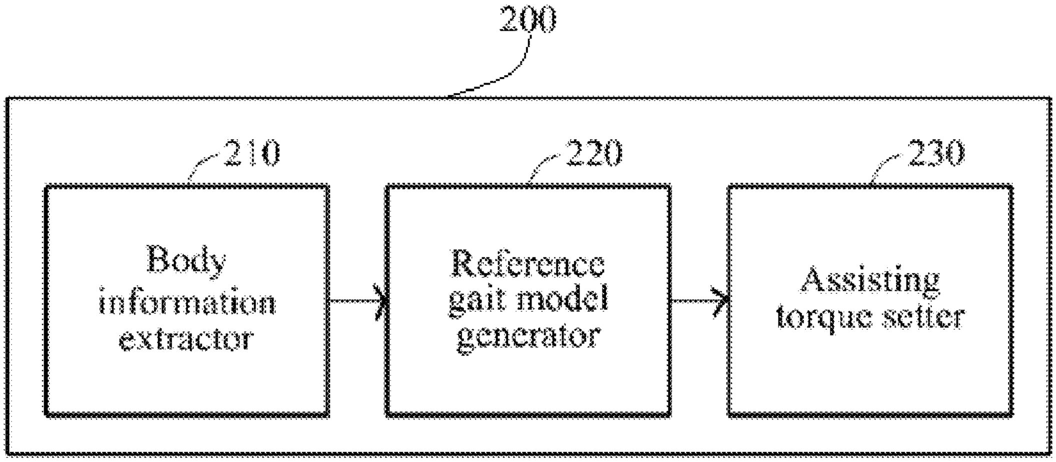
FIG. 2 illustrates an example of an assisting torque setting apparatus according to example embodiments.

FIG. 2 illustrates an assisting torque setting apparatus 200 according to example embodiments.

Referring to FIG. 2, in some example embodiments, the assisting torque setting apparatus 200 may be a separate apparatus physically independent of a walking assistance apparatus 100. In other example embodiments, the assisting torque setting apparatus 200 may be implemented as a logical model in the walking assistance apparatus 100. For example, the assistance torque setting apparatus 200 may be implemented the controller 140.

The assisting torque setting apparatus 200 may include a body information extractor 210, a reference gait model generator 220, and an assisting torque setter 230.

The body information extractor 210 may extract body information of a user. In this example, the body information may include at least one of joint information, muscle information, and nerve information of the user.

The joint information may include, for example, a length, a weight, and an inertia moment of a joint, and a connecting position between joints. The joint information may be expressed based on a body segment parameter.

To determine the joint information, the body information extractor 210 may measure gait information of the user using a motion capturing apparatus or a force plate apparatus, and extract the joint information of the user based on the measured gait information. Examples of extracting joint information will be discussed below with reference to FIG. 6.

For example, when a marker is attached to the joint of the user, the body information extractor 210 may measure information on a length and a position of the joint of the user and movement information of the joint moving during a gait, by using the motion capturing apparatus. The body information extractor 210 may acquire the length for each joint, and a connecting position between the joints based on the measured information. When a six-axis force plate is disposed under a foot of the user, the body information extractor 210 may measure a ground reaction based on the gait using the six-axis force plate. Subsequently, the body information extractor 210 may extract accurate joint information by applying a dynamics model and an optimization scheme to the measured information using the motion capturing apparatus and the six-axis force plate.

In an example, the body information extractor 210 may acquire information on, for example, a height and a weight of the user, and proportionally calculate the joint information based on statistical information.

Additionally, in regards to the muscle information, the body information extractor 210 may estimate the muscle information based on the joint information. The muscle information may indicate muscle activation characteristics and may include, for example, an instantaneous maximum muscular strength, a muscular endurance, and a maximum muscular strength value. Also, the muscle information may be expressed based on a muscle parameter. As an example, the body information extractor 210 may estimate a moment applied to an inside of the body based on the joint information, and calculate an intensity of force generated by the muscle by performing a simulation based on the joint information, the estimated moment, and information on a position at which the muscle and a skeleton are attached to one another. The body information extractor 210 may estimate a muscle usage amount and bilateral symmetry information based on information on the force generated by the muscle, and may determine whether the muscle is in a normal state based on at least one of the muscle usage amount and the bilateral symmetry information. When the muscle is determined to be in an abnormal state, the body information extractor 210 may estimate a disease symptom pattern of the user based on the gait information of the user. The body information extractor 210 may model the disease symptom pattern of the user, and extract the muscle information based on the joint information and the modeled disease symptom pattern.

In an example, the body information extractor 210 may measure an electromyogram (EMG) signal of the user based on the gait of the user using an EMG sensor, and estimate the muscle activation characteristics based on the EMG signal.

Also, in regards to the nerve information, the body information extractor 210 may extract the nerve information of the user while the user is walking. A micro-excitation signal generated in a nerve system may be used to generate the force using the muscle. Based on the micro-excitation signal, a positive feedback may be applied to the muscle, thereby generating the force. To this end, information on a chain reaction relationship between other signals and a delay rate in a general nerve reaction may be necessary. The body information extractor 210 may extract nerve information related thereto. The assisting torque setting apparatus 200 may estimate an accurate motion of the user based on the extracted nerve information. The nerve information may include a nerve conduction speed, and may be expressed based on a neural parameter, for example, a feedback amplifier gain.

The reference gait model generator 220 may generate a reference gait model by applying the extracted body information of the user to a desired (or, alternatively, a predetermined) body model. In this example, the reference gait model may be obtained by representing a muscle control mechanism of the user, and may indicate a model obtained by simulating the gait of the user. The reference gait model generator 220 may generate the reference gait model through a simulation including applying at least one of the joint information, the muscle information, and the nerve information extracted by the body information extractor 210, to the desired (or, alternatively, the predetermined) body model. Examples of generating a reference gait model will be discussed below with reference to FIG. 7.

As an example, based on the optimization scheme such as a computed muscle control scheme and the like, the reference gait model generator 220 may generate a proportion-differential controller providing a command to the muscle to perform a gait in the simulation, and extract the reference gait model using the proportion-differential controller.

In an example, the reference gait model generator 220 may generate the reference gait model to which the disease symptom of the user based on the disease symptom pattern modeled by the body information extractor 210.

The assisting torque setter 230 may adjust the assisting torque provided from the walking assistance apparatus to the user based on the reference gait model. In some example embodiments, the assistance torque setter 230 may adjust the assistance torque to an optimal assisting torque based on the reference gait model.

For example, the assisting torque setter 230 may set the assistance torque to the optimal assisting torque such that the assistance torque delivered from the walking assistance apparatus to the user allows the user to walk using a minimum amount of energy. In general, the user may walk using the minimum amount of energy to maintain a desired speed during the gait under current muscle conditions. Also, the walking assistance apparatus may generate the assisting torque using a driving portion, and provide the generated assisting torque to the user.

Conventionally, when an equal assisting torque is provided to the user irrespective of characteristics of the user, the user may use a large amount of energy to walk. For example, when a conventional walking assistance apparatus provides an equal assisting torque to a left hamstring muscle in a damaged state and a right hamstring muscle in a normal state, the user may use the large amount of energy during the gait and thus, may not maintain the gait smoothly. In contrast, in at least some example embodiments, based on the characteristics of the user, the walking assistance apparatus 100 may provide the optimal assisting torque to the user to allow the user to walk using the minimum amount of energy.

Since the reference gait model is provided based on the body information of the user, the assisting torque setter 230 may apply the reference gait model to a simulation to realize the gait of the user in the simulation. Also, the assisting torque setter 230 may apply a mechanism that the walking assistance apparatus 100 delivers the assisting torque using the driving portion 110 to the reference gait model. Through this, the assisting torque setter 230 may realize the gait of the user wearing the walking assistance apparatus 100 in the simulation. The assisting torque setter 230 may set the optimal assisting torque by adjusting the assisting torque provided from the walking assistance apparatus 100 to the user based on the simulation performed by realizing the gait of the user wearing the walking assistance apparatus 100.

The assisting torque setter 230 may extract an amount of energy used by the user during the gait by calculating a metabolic cost of transport (MCOT). The MCOT may indicate metabolic energy used by the user while the user is walking. The assisting torque setter 230 may calculate the MCOT by obtaining a sum of the energy used for each joint of the user during the gait. The MCOT may be expressed as shown in Equation 1.

$$E=\int_{t=0}^{tf}\Sigma F\cdot v dt \quad \text{[Equation 1]}$$

In Equation 1, E denotes the energy used by the user during the gait, F denotes force generated by the muscle to perform the gait, v denotes a moving velocity of the muscle, 1 denotes a moving distance of the user, m denotes a total mass of the muscle, and F·v denotes a work ratio of the muscle. The assisting torque setter 230 may set the MCOT as an objective function, and set an optimal assisting torque minimizing the objective function. In some example embodiments, the moving distance 1 may indicate a distance of a single step of the gait. In this example, E may indicate energy used by the user to make the single step of the gait.

In an example, the assisting torque setter 230 may extract an optimal assisting torque profile for minimizing the MCOT by adjusting a trajectory of a change in the assisting torque. Hereinafter, the trajectory of the change in the assisting torque may also be referred to as a change trajectory of the assisting torque. In this example, an assisting torque profile may indicate a change trajectory of the assisting torque based on a desired (or, alternatively, a predetermined) interval. For example, the assisting torque profile may indicate a change trajectory of an assisting torque applied to the user while the user is making the single step of the gait.

The assisting torque setter 230 may set an initial change trajectory of the assisting torque, and set the initial change trajectory as an initial assisting torque profile. In an example, the assisting torque setter 230 may set, as the initial change trajectory, a pattern of a change in the assisting torque provided from the walking assistance apparatus 100 to the user to perform a normal gait. For example, based on the body information of the user, the assisting torque setter 230 may extract an intensity of force required for each muscle of the user to perform the normal gait and an actual intensity of force generated by each muscle of the user. Subsequently, the assisting torque setter 230 may set the initial change trajectory of the assisting torque based on a difference of the extracted intensities. In another example, the assisting torque setter 230 may set a desired (or, alternatively, a predetermined) change trajectory of the assisting torque as the initial change trajectory.

The assisting torque setter 230 may generate the optimal assisting torque profile by adjusting the initial change trajectory. Examples of generating an optimal assisting torque profile will be discussed below with reference to FIGS. 8A and 8B.

The assisting torque setter 230 may extract the MCOT based on the initial change trajectory to adjust the initial change trajectory. In this example, the assisting torque setter 230 may extract a variation of the MCOT based on a result of the adjusting, and adjust the change trajectory to reduce the MCOT until minimized based on the extracted variation of the MCOT. For example, the assisting torque setter 230 may extract a variation of the MCOT based on a tenuous change in the change trajectory, and adjust the change trajectory until the MCOT is minimized. When the MCOT is determined to be a minimized value, the assisting torque setter 230 may set a change trajectory corresponding to the minimized value as an optimal change trajectory, and generate the optimal assisting torque profile based on the optimal change trajectory. When the walking assistance apparatus provides the assisting torque based on the optimal assisting torque profile, the user may walk using a reduced amount of energy and thus, an efficiency of the walking assistance apparatus may increase.

In an example, the assisting torque setter 230 may extract the optimal change trajectory minimizing the MCOT based on a dynamic programming or a rapidly-exploring random tree (RRT). Also, the assisting torque setter 230 may extract the optimal change trajectory minimizing the MCOT based on any scheme of extracting an optimal value as well as the dynamic programming and the RRT.

In an example, based on the reference gait model, the assisting torque setter 230 may extract an optimal gain minimizing the MCOT by adjusting a gain of the driving portion in the walking assistance apparatus outputting an assisting torque corresponding to at least one of a hip-joint angle and a hip-joint angular velocity of the user.

The assisting torque setter 230 may measure the hip-joint angle or the hip-joint angular velocity of the user by using a sensor, for example, a sensor included in the walking assistance apparatus, attached to the user. The assisting torque setter 230 may set a different assisting torque based on the hip-joint angle or the hip-joint angular velocity of the user. In an example, the assisting torque setter 230 may set the assisting torque corresponding to the hip-joint angle or the hip-joint angular velocity in advance. For example, when a difference between a left hip-joint angle and a right hip-joint angle is relatively small, the assisting torque setter 230 may set a correspondingly large amount of assisting torque. Conversely, when the difference between a left hip-joint angle and a right hip-joint angle is relatively large, the assisting torque setter 230 may set a correspondingly small amount of assisting torque. Accordingly, the assisting torque setter 230 may adaptively set the assisting torque based on the hip-joint angle or the hip-joint angular velocity of the user. Also, in another example, the assisting torque setter 230 may set the assisting torque irrespective of the hip-joint angle or the hip-joint of the user.

The assisting torque setter 230 may set the optimal gain by adjusting the gain of the driving portion to correspond to the set assisting torque. In an example, the assisting torque setter 230 may realize the gait of the user wearing the walking assistance apparatus on the simulation based on the reference gait model, and extract the optimal gain by adjusting the gain of the driving portion to correspond to an assisting torque set on the simulation. The assisting torque setter 320 may set the gain corresponding to the set assisting torque as an initial gain, and adjust the initial gain. The assisting torque setter 230 may extract a variation of the MCOT based on a result of the adjusting of the gain, and adjust the gain to reduce the MCOT until minimized.

In an example, the assisting torque setter 230 may set the optimal gain based on a Newton method. Also, the assisting torque setter 230 may extract the optimal gain minimizing the MCOT based on any scheme of performing an optimization as well as the Newton method.

The assisting torque setter 230 may continuously provide a feedback on the hip-joint angle or the hip-joint angular velocity of the user. Also, the assisting torque setter 230 may extract the optimal gain minimizing the MCOT for each time of the hip-joint angle or the hip-joint angular velocity changed to be greater than or equal to a desired (or, alternatively, a predetermined) threshold range. Accordingly, the assisting torque setter 230 may provide the assisting torque to the user to walk using a minimum amount of energy in response to an instant change in a movement of the user.

The assisting torque setter 230 may extract the optimal assisting torque profile or the optimal gain based on a gait environment, for example, a gait task of the user. Examples of extracting the optimal gain based on the gain environment will be discussed below with reference to FIGS. 9A and 9B.

When a similar or equal gait task, for example, a level walking task, an ascending gait task, a descending gait task, a stepping-up gait task, and a stepping-down gait task, is maintained for a desired (or, alternatively, a predetermined) period of time, the assisting torque setter 230 may generate the initial assisting torque profile and adjust the initial change trajectory, thereby extracting the optimal assisting torque profile. In response to a sudden change in the gait task, for example, from the level walking task to the ascending gait task, the walking assistance apparatus may adjust the gain of the driving portion outputting the assisting torque corresponding to at least one of the hip-joint angle and the hip-joint angular velocity of the user, thereby extracting the optimal gain.

The assisting torque setter 230 may set the assisting torque such that the user uses a desired (or, alternatively, a predetermined) amount of energy during the gait. In general, the user may walk using a minimum energy to walk at a desired speed based on a current muscle condition. When the user walks to intensify the muscle, the user may need to walk using at least the desired (or, alternatively, the predetermined) amount of energy by increasing a load applied to the muscle. To this end, the assisting torque setter 230 may set the energy used by the user during the gait or receive the energy from an external source in advance, and set the assisting torque such that the user uses the desired (or, alternatively, the predetermined) amount of energy during the gait. In this example, the assisting torque setter 230 may extract the optimal assisting torque profile or the optimal gain allowing the MCOT to converge to a desired (or, alternatively, a predetermined) amount.

The assisting torque setting apparatus 200 may transmit information associated with the body information extracted by the body information extractor 210, the reference gait model generated by the reference gait model generator 220, or the optimal assisting torque set by the assisting torque setter 230, to the external apparatus, for example, a server and an external walking assistance apparatus, by using the communication interface.

Figure 3:
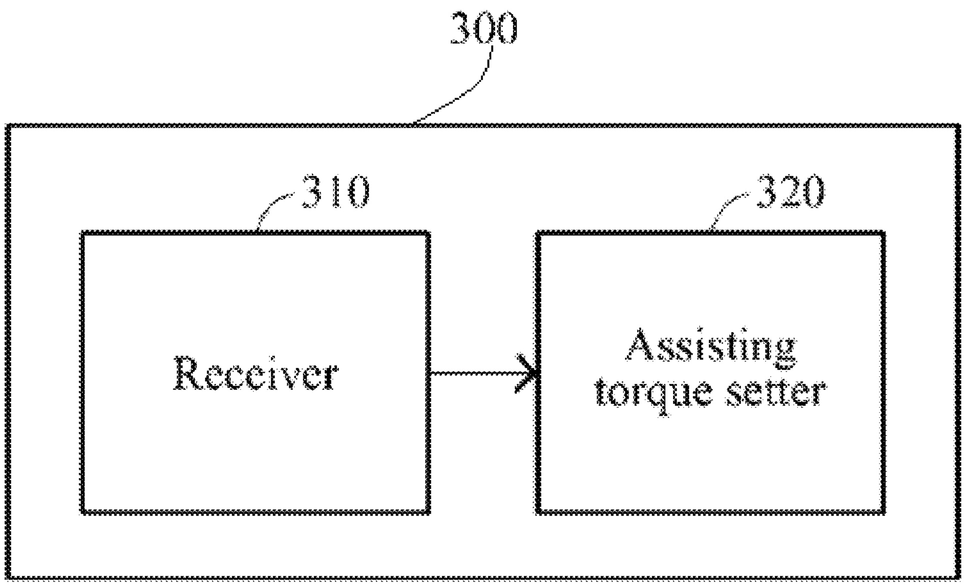
FIG. 3 illustrates another example of a walking assistance apparatus according to example embodiments.

FIG. 3 illustrates a walking assistance apparatus 300 according to example embodiments.

Referring to FIG. 3, the walking assistance apparatus 300 includes a receiver 310 and an assisting torque setter 320.

The receiver 310 may receive, from an external apparatus, a reference gait model generated by applying body information of a user to a desired (or, alternatively, a predetermined) body model. The receiver 310 may receive the reference gait model from the assisting torque setting apparatus 200 of FIG. 2 using a communication interface, or receive the reference gait model from a different apparatus, for example, a server. In this example, the reference gait model may be obtained by representing a muscle control mechanism of the user, and may indicate a model obtained by simulating the gait of the user. The reference gait model may be generated by the external apparatus, for example, a server and the assisting torque setting apparatus 200, through a simulation of applying at least one of joint information, muscle information, and nerve information to the desired (or, alternatively, the predetermined) body model. As an example, based on an optimization scheme such as a computed muscle control scheme and the like, the external apparatus may generate a proportion-differential controller providing a command to the muscle to perform a gate in the simulation, and generate the reference gait model using the proportion-differential controller.

The assisting torque setter 320 may set an assisting torque by adjusting the assisting torque provided from the walking assistance apparatus 300 to the user based on the reference gait model. For example, the assisting torque setter 320 may set the assisting torque as an optimal assisting torque. In this example, the optimal assisting torque may indicate a force delivered from the walking assistance apparatus 300 to the user to allow the user to walk using a minimum amount of energy.

The assisting torque setter 320 may extract an amount of energy used by the user during the gait by calculating an MCOT. The MCOT may be expressed as shown in Equation 1. As described above, the assisting torque setter 320 may calculate the MCOT based on a force generated by the muscle to perform the gait, a moving velocity of the muscle, a moving distance of the user, and a total mass of the muscle.

In an example, the assisting torque setter 320 may extract an optimal assisting torque profile for minimizing the MCOT by adjusting a change trajectory of the assisting torque. The assisting torque setter 320 may set an initial change trajectory of the assisting torque, and set the set initial change trajectory as the initial assisting torque profile. As an example, the assisting torque setter 320 may set, as the initial change trajectory, a pattern of a change in the assisting torque provided from the walking assistance apparatus 300 to the user to perform a normal gait. As another example, the assisting torque setter 320 may set a desired (or, alternatively, a predetermined) change trajectory of the assisting torque as the initial change trajectory.

The assisting torque setter 320 may generate the optimal assisting torque profile by adjusting the initial change trajectory. The assisting torque setter 320 may extract the MCOT based on the initial change trajectory to adjust the initial change trajectory. In this example, the assisting torque setter 320 may extract a variation of the MCOT based on a result of the adjusting, and adjust the change trajectory to reduce the MCOT until minimized. For example, the assisting torque setter 320 may extract a variation of the MCOT based on a tenuous change in the change trajectory, and adjust the change trajectory until the MCOT is minimized. When the MCOT is determined to be a minimized value, the assisting torque setter 320 may set a change trajectory corresponding to the minimized value as an optimal change trajectory, and generate the optimal assisting torque profile based on the optimal change trajectory. The walking assistance apparatus 300 may provide the assisting torque based on the optimal assisting torque profile. Thus, the user may walk using a reduced amount of energy.

In an example, the assisting torque setter 320 may extract the optimal change trajectory minimizing the MCOT based on a dynamic programming or an RRT. Also, the assisting torque setter 320 may extract the optimal change trajectory minimizing the MCOT based on any scheme of extracting an optimal change trajectory as well as the dynamic programming and the RRT.

In an example, based on the reference gait model, the assisting torque setter 320 may extract an optimal gain minimizing the MCOT by adjusting a gain of the driving portion in the walking assistance apparatus 300 outputting an assisting torque corresponding to at least one of a hip-joint angle and a hip-joint angular velocity of the user.

The assisting torque setter 320 may measure the hip-joint angle or the hip-joint angular velocity of the user using a sensor, for example, an IMU sensor and a potentiometer, attached to the walking assistance apparatus 300. The assisting torque setter 320 may set a different assisting torque based on the hip-joint angle or the hip-joint angular velocity of the user. In an example, the assisting torque setter 320 may set the assisting torque corresponding to the hip-joint angle or the hip-joint angular velocity in advance. For example, when a difference between a left hip-joint angle and a right hip-joint angle is relatively small, the assisting torque setter 320 may set a correspondingly large amount of assisting torque. Conversely, when the difference between a left hip-joint angle and a right hip-joint angle is relatively large, the assisting torque setter 320 may set a correspondingly small amount of assisting torque. Accordingly, the assisting torque setter 320 may adaptively set the assisting torque based on the hip-joint angle or the hip-joint angular velocity of the user. Also, in another example, the assisting torque setter 320 may set the assisting torque irrespective of the hip-joint angle or the hip-joint of the user.

The assisting torque setter 320 may set the optimal gain by adjusting the gain of the driving portion to correspond to the set assisting torque. In this example, the assisting torque setter 320 may track a change in the MCOT based on a result of the adjusting of the gain, and adjust the gain to reduce the MCOT until minimized.

In an example, the assisting torque setter 320 may set the optimal gain based on a Newton method. Also, the assisting torque setter 320 may extract the optimal gain minimizing the MCOT based on any scheme of performing an optimization as well as the Newton method.

The assisting torque setter 320 may continuously provide a feedback on the hip-joint angle or the hip-joint angular velocity of the user. Also, the assisting torque setter 230 may extract the optimal gain minimizing the MCOT for each time of the hip-joint angle or the hip-joint angular velocity changed to be greater than or equal to a desired (or, alternatively, the predetermined) threshold range. The walking assistance apparatus 300 may operate the driving portion based on the optimal gain to provide the assisting torque to the user. Accordingly, the assisting torque setter 320 may provide the assisting torque to the user to walk using a minimum amount of energy in response to an instant change in a movement of the user.

The assisting torque setter 320 may extract the optimal assisting torque profile or the optimal gain based on a gait task of the user. For example, when a similar or equivalent gait task is maintained, the assisting torque setter 320 may generate the initial assisting torque profile and adjust the initial change trajectory, thereby extracting the optimal assisting torque profile. Also, in response to a sudden change in the gait task, the walking assistance apparatus 300 may adjust the gain of the assisting torque corresponding to at least one of the hip-joint angle and the hip-joint angular velocity of the user, thereby extracting the optimal gain.

The assisting torque setter 320 may set the assisting torque such that the user uses a desired (or, alternatively, a predetermined) amount of energy during the gait. In general, the user may walk using a minimum energy to walk at a desired speed based on a current muscle condition. When the user walks to intensify the muscle, the user may need to walk using at least the desired (or, alternatively, the predetermined) amount of energy by increasing a load applied to the muscle. To this end, the assisting torque setter 320 may set the energy used by the user during the gait or receive the energy from an external source in advance, and set the assisting torque such that the user uses the desired (or, alternatively, the predetermined) amount of energy during the gait. In this example, the assisting torque setter 320 may extract the optimal assisting torque profile or the optimal gain allowing the MCOT to converge to a desired (or, alternatively, a predetermined) amount.

In an example, the walking assistance apparatus 300 may include a selector (not shown). The selector may select an operation mode of the walking assistance apparatus 300. In this example, the operation mode may include a first operation mode, for example, a normal mode, of providing the assisting torque to the user, and a second operation mode, for example, a fitting mode, of setting the optimal assisting torque. As an example, the selector may receive the operation mode from the user. When the second operation mode is selected in the selector, the assisting torque setter 320 may set the optimal assisting torque.

The walking assistance apparatus 300 may transmit information associated with the optimal assisting torque set by the assisting torque setter 320, to the external apparatus, for example, a server, by using the communication interface.

Figure 4:
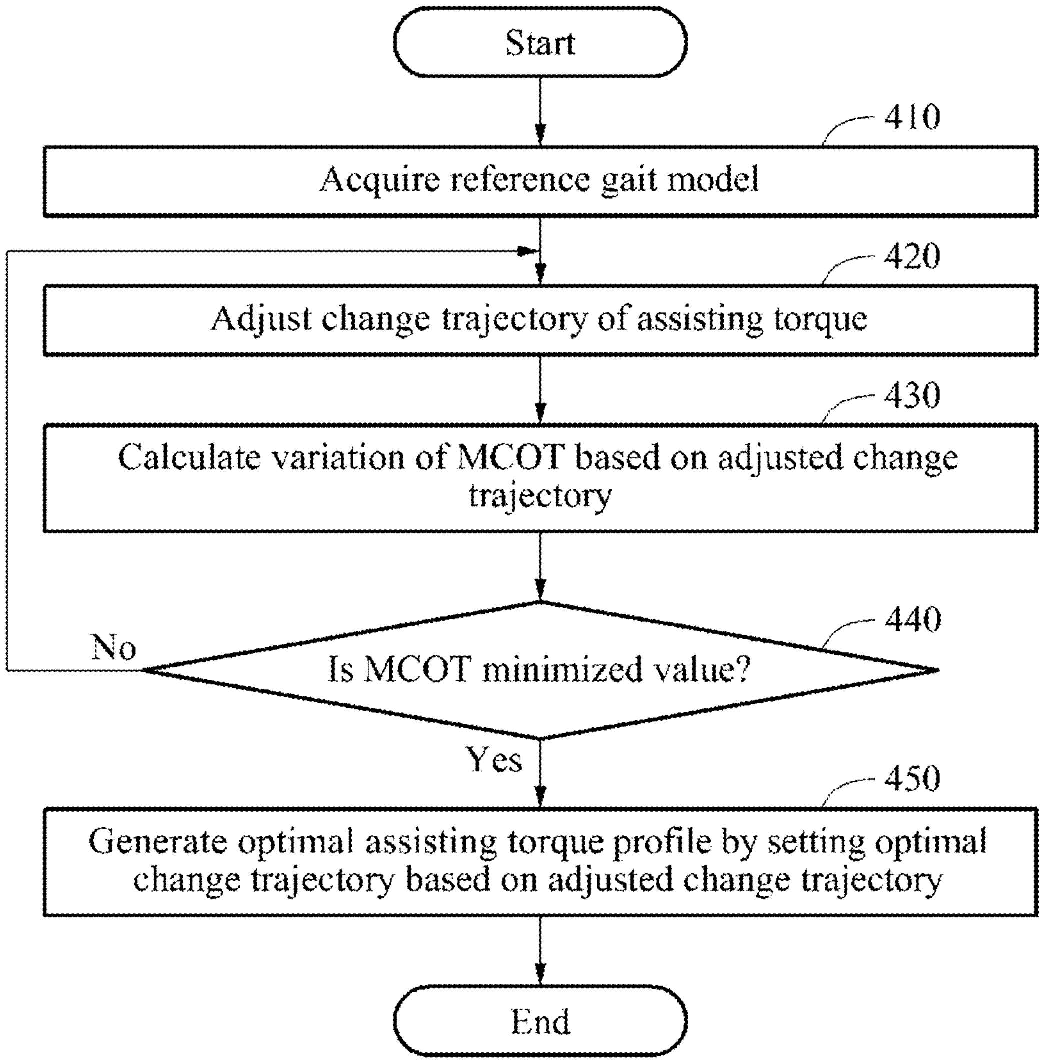
FIG. 4 illustrates an example of extracting an optimal assisting torque profile according to example embodiments.

FIG. 4 illustrates an example of extracting an optimal assisting torque profile according to example embodiments.

Referring to FIG. 4, in operation 410, the assisting torque setting apparatus 200, 320 acquires a reference gait model. For example, as illustrated in FIG. 2, the assisting torque setting apparatus 200 may extract body information of a user, and extract the reference gait model by applying the extracted body information to a desired (or, alternatively, a predetermined) body model. In other example embodiments, as illustrated in FIG. 3, the assisting torque setter 320 may receive the reference gait model from an external apparatus using a communication interface.

In operation 420, the assisting torque setting apparatus 200, 320 adjusts a change trajectory of an assisting torque. The assisting torque setting apparatus may set an initial change trajectory of the assisting torque, and set the set initial change trajectory as an initial assisting torque profile. As an example, the assisting torque setting apparatus may set, as the initial change trajectory, a pattern of a change in the assisting torque provided from a walking assistance apparatus to the user to perform a normal gait. As another example, the assisting torque setting apparatus may set a desired (or, alternatively, a predetermined) change trajectory of the assisting torque as the initial change trajectory. The assisting torque setting apparatus 200, 320 may adjust the initial change trajectory, and may adjust the change trajectory until an MCOT is minimized with reference to the following descriptions.

In operation 430, the assisting torque setting apparatus calculates a variation of the metabolic cost of transport MCOT based on the adjusted change trajectory. The MCOT may be expressed as shown in Equation 1. As described above, the assisting torque setting apparatus 200, 320 may calculate the MCOT based on a force generated by a muscle to perform a gait, a moving velocity of the muscle, a moving distance of the user, and a total mass of the muscle. The assisting torque setting apparatus 200, 320 may re-calculate the variation of the MCOT based on the change trajectory is adjusted.

In operation 440, the assisting torque setting apparatus 200, 320 determines whether the MCOT is a minimized value based on the variation of the MCOT in response to the adjusted change trajectory.

In operation 450, when the MCOT is determined to be the minimized value, the assisting torque setting apparatus 200, 320 sets a change trajectory corresponding to the minimized value of the MCOT as an optimal change trajectory, and generates an optimal assisting torque profile based on the set optimal change trajectory.

Alternatively, when the MCOT is determined not to be the minimized value, in operation 420, the assisting torque setting apparatus readjusts the change trajectory of the assisting torque. In this example, the assisting torque setting apparatus may adjust the initial change trajectory. Also, the assisting torque setting apparatus may readjust a pre-adjusted change trajectory. Accordingly, the assisting torque setting apparatus may adjust the change trajectory to reduce the MCOT until minimized.

Figure 5:
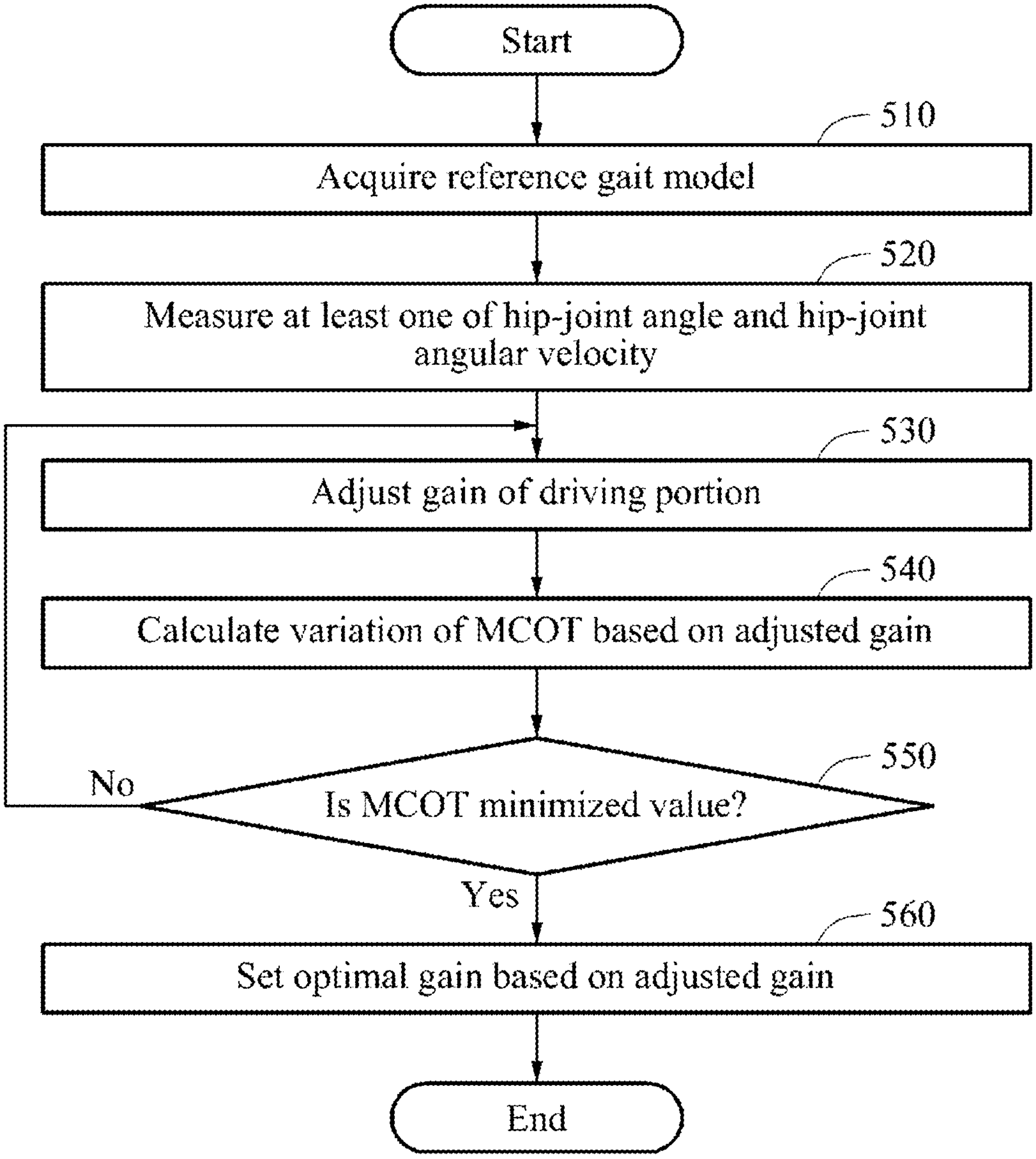
FIG. 5 illustrates an example of extracting an optimal gain according to example embodiments.

FIG. 5 illustrates an example of extracting an optimal gain according to example embodiments.

Referring to FIG. 5, in operation 510, an assisting torque setting apparatus 200, 320 acquires a reference gait model. The assisting torque setting apparatus 200 may extract body information of a user, and set the reference gait model by applying the extracted body information to a desired (or, alternatively, a predetermined) body model. Also, in an example, the assisting torque setting apparatus 320 may receive the reference gait model from an external apparatus using a communication interface.

In operation 520, the assisting torque setting apparatus 200, 320 measures at least one of a hip-joint angle and a hip-joint angular velocity of the user by using a sensor, for example, a sensor included in a walking assistance apparatus, attached to the user. In an example, the assisting torque setting apparatus may set a different assisting torque based on the hip-joint angle or the hip-joint angular velocity of the user. For example, the assisting torque setting apparatus may set the assisting torque corresponding to the hip-joint angle or the hip-joint angular velocity in advance. Also, in another example, the assisting torque setting apparatus may set the assisting torque irrespective of the hip-joint angle or the hip-joint of the user.

In operation 530, the assisting torque setting apparatus 200, 320 adjusts a gain of the driving portion 110 to correspond to the set assisting torque. For example, the assisting torque setting apparatus 200, 320 may set the gain of the driving portion 110 as an initial gain, and adjust the initial gain. In this example, the assisting torque setting apparatus may adjust the gain until the MCOT is minimized.

In operation 540, the assisting torque setting apparatus 200, 320 calculates a variation of an MCOT based on the adjusted gain. The MCOT may be expressed as shown in Equation 1. As described above, the assisting torque setting apparatus 200, 320 may calculate the MCOT based on a force generated by a muscle to perform a gait, a moving velocity of the muscle, a moving distance of the user, and a total mass of the muscle. The assisting torque setting apparatus may calculate the variation of the MCOT based on an adjusted gain for each time of adjusting the gain.

In operation 550, the assisting torque setting apparatus 200, 320 determines whether the MCOT is a minimized value based on the variation of the MCOT varying in response to the adjusted change trajectory. When the MCOT is determined to be the minimized value, the assisting torque setting apparatus 200, 320 sets a gain corresponding to the minimized value of the MCOT as an optimal gain in operation 560. When the MCOT is determined not to be the minimized value, the assisting torque setting apparatus 200, 320 adjusts the gain in operation 530. In this example, the assisting torque setting apparatus 200, 320 may adjust the initial gain. Also, the assisting torque setting apparatus 200, 320 may readjust a pre-adjusted gain. Accordingly, the assisting torque setting apparatus 200, 320 may adjust the gain to reduce the MCOT until minimized.

The assisting torque setting apparatus 200, 320 may continuously provide a feedback on the hip-joint angle or the hip-joint angular velocity of the user. Also, the assisting torque setting apparatus may extract the optimal gain minimizing the MCOT each time the hip-joint angle or the hip-joint angular velocity is changed to be greater than or equal to a desired (or, alternatively, a predetermined) threshold range.

Figure 6:
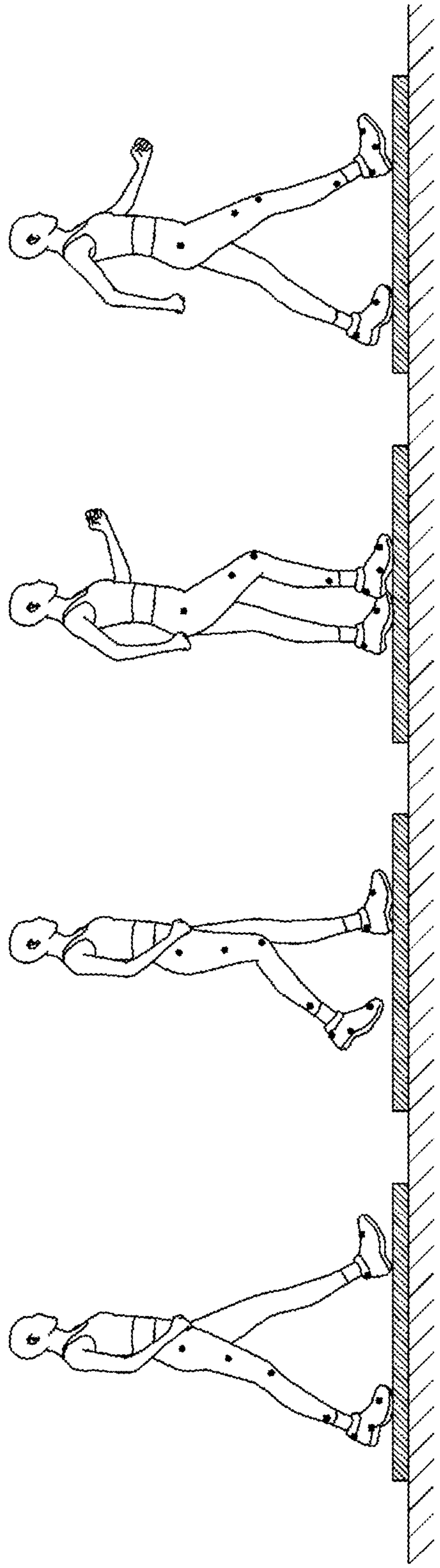
FIG. 6 illustrates an example of extracting joint information according to example embodiments.

FIG. 6 illustrates an example of extracting joint information according to example embodiments.

Referring to FIG. 6, a marker may be attached to a joint of a user to measure gait information of the user. Also, a six-axis force plate may be disposed under a foot of the user. An assisting torque setting apparatus may use a motion capturing apparatus to measure information on a length and a position of the joint of the user based on a position of the marker, and to measure movement information of the joint moving during a gait in response to the marker moving based on the gait. The assisting torque setting apparatus may acquire the length for each joint, and a connecting position between joints based on the measured information.

Also, the assisting torque setting apparatus may measure a ground reaction based on the gait using the six-axis force plate. The assisting torque setting apparatus may extract accurate joint information by applying a dynamics model and an optimization scheme to the measured information using the motion capturing apparatus and the six-axis force plate.

Figure 7:
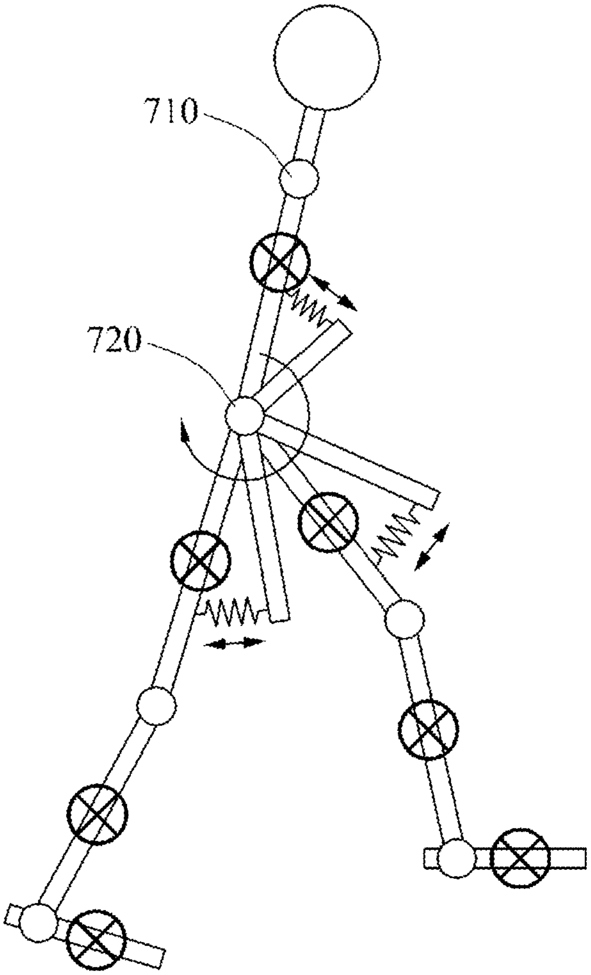
FIG. 7 illustrates an example of a reference gait model according to example embodiments.

FIG. 7 illustrates a reference gait model 710 according to example embodiments.

Referring to FIG. 7, an assisting torque setting apparatus 200 may generate the reference gait model 710 by applying at least one of joint information, muscle information, and nerve information to a desired (or, alternatively a predetermined) body model.

As an example, based on an optimization scheme such as a computed muscle control scheme and the like, the assisting torque setting apparatus may generate a proportion-differential controller providing a command to a muscle to perform a gate in the simulation, and generate the reference gait model 710 using the proportion-differential controller.

In an example, the assisting torque setting apparatus may model a disease symptom pattern of the user based on the gait information of the user, and generate the reference gait model 710 to which a disease symptom of the user is applied, based on the modeled disease symptom pattern.

Also, the assisting torque setting apparatus may apply a mechanism of a walking assistance apparatus 100, 720 delivering an assisting torque using the driving portion 100, to the reference gait model 710. Through this, the assisting torque setting apparatus may realize a gait of the user wearing the walking assistance apparatus 720 in the simulation. The assisting torque setting apparatus 200 may set an optimal assisting torque by adjusting the assisting torque provided from the walking assistance apparatus 100, 720 to the user based on a model provided by applying the mechanism of the walking assistance apparatus 100, 720 to the reference gait model 710.

Figure 8A:
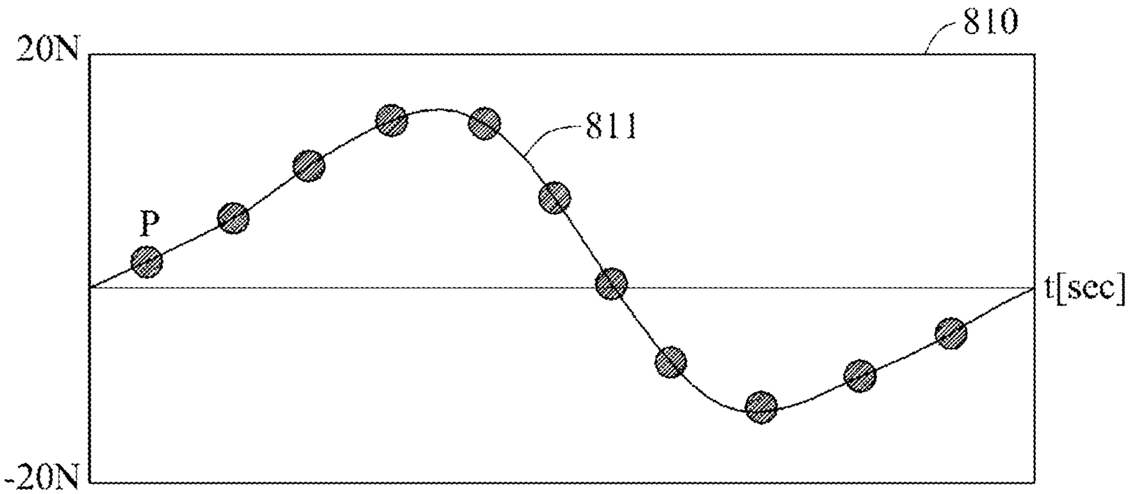
FIGS. 8A and 8B illustrate other examples of extracting an optimal assisting torque profile according to example embodiments.
Figure 8B:
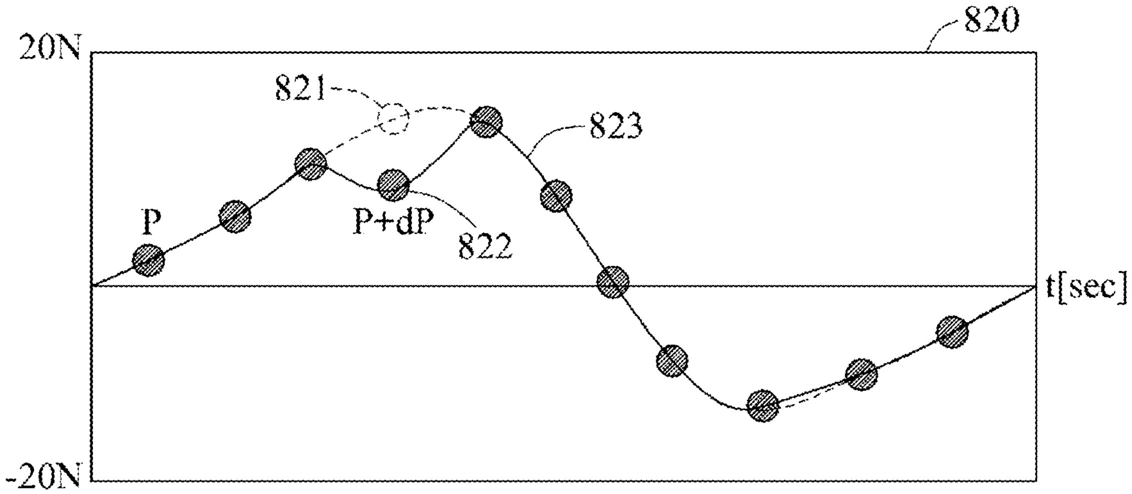

FIGS. 8A and 8B illustrate other examples of extracting an optimal assisting torque profile according to example embodiments.

Referring to FIGS. 8A and 8B, in graphs 810 and 820, a horizontal axis represents a time, for example, a period of time for making a single step during a gait of a user, and a vertical axis represents an assisting torque.

An assisting torque setting apparatus 200, 320 may set an initial change trajectory 811 of the assisting torque P, and set the initial change trajectory 811 as an initial assisting torque profile 810. For example, the assisting torque setting apparatus 200, 320 may set, as the initial change trajectory 811, a pattern of a change in the assisting torque dP provided from a walking assistance apparatus 100 to the user to perform a normal gait. Also, the assisting torque setting apparatus may set a desired (or, alternatively, a predetermined) change trajectory as the initial change trajectory 811 of the assisting torque.

The assisting torque setting apparatus 200, 320 may adjust the initial change trajectory 811. For example, the assisting torque setting apparatus may change an assisting torque 821 to an assisting torque 822 in the initial change trajectory 811. The assisting torque setting apparatus 200, 320 may extract a variation of an MCOT based on a result of the adjusting, and determine whether the MCOT is a minimized value, based on the variation of the MCOT. When the MCOT is determined to be the minimized value, the assisting torque setting apparatus 200, 320 may set a change trajectory 823 corresponding to the minimized value of the MCOT as an optimal change trajectory, and generate an optimal assisting torque profile 820 based on the optimal change trajectory. When the MCOT is determined not to be the minimized value, the assisting torque setting apparatus 200, 320 may adjust a change trajectory to reduce the MCOT until minimized. In an example, the assisting torque setting apparatus 200, 320 may extract the optimal change trajectory minimizing the MCOT by adjusting the change trajectory based on a dynamic programming or an RRT.

Figure 9A:
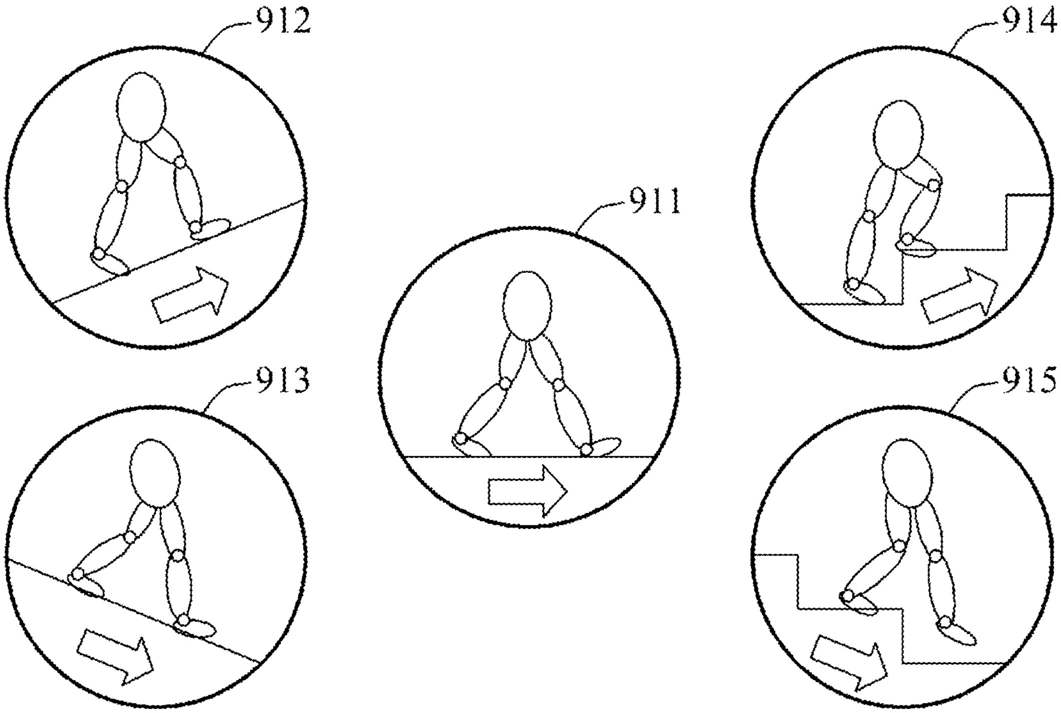
FIGS. 9A and 9B illustrate examples of extracting an optimal gain based on a change in a gait task.
Figure 9B:
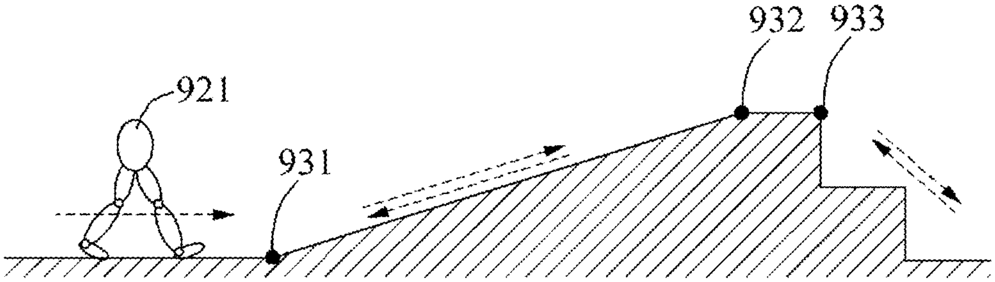

FIGS. 9A and 9B illustrate examples of extracting an optimal gain based on a change in a gait task.

Referring to FIGS. 9A and 9B, a hip-joint angle or a hip-joint angular velocity of a user wearing a walking assistance apparatus may be changed by at least a desired (or, alternatively, a predetermined level) based on the gait task.

FIG. 9A illustrates various gait tasks, for example, a level walking task 911, an ascending gait task 912, a descending gait task 913, a stepping-up task 914, and a stepping-down task 915. Based on each of the gait tasks, the hip-joint angle or the hip-joint angular velocity of the user may change by at least a desired (or, alternatively, a predetermined) level.

For example, in FIG. 9B, a user wearing a walking assistance apparatus 921 may perform a gait based on the level walking task 911. In this example, the walking assistance apparatus 100, 921 may receive a reference gait model generated by applying body information of a user to a desired (or, alternatively, a predetermined) body model, from an external apparatus. Based on the received reference gait model, the walking assistance apparatus 100, 921 may generate an initial assisting torque profile indicating an assisting torque provided from the walking assistance apparatus 100, 921 to the user, and extract an optimal assisting profile for minimizing an MCOT by adjusting a change trajectory. For the level walking task 911, the walking assistance apparatus 100, 921 may provide the assisting torque to the user based on the optimal assisting torque profile.

At a point 931, the level walking task 911 may be changed to the ascending gait task 912 such that a hip-joint angle or a hip-joint angular velocity of the user performing the gait is to be greater than or equal to a desired (or, alternatively, a predetermined) threshold range. In this example, the walking assistance apparatus 100, 921 may measure the hip-joint angle or the hip-joint angular velocity and adjust a gain of a driving portion outputting an assisting torque corresponding to at least one of the hip-joint angle and the hip-joint angular velocity, thereby extracting an optimal gain minimizing the MCOT. For the ascending gait task 912, the walking assistance apparatus 100, 921 may set the gain of the driving portion as the optimal gain.

At a point 932, the ascending gait task 912 may be changed to the level walking task 911 such that the hip-joint angle or the hip-joint angular velocity of the user performing the gait is to be greater than or equal to the desired (or, alternatively, predetermined) threshold range. In this example, the walking assistance apparatus 100, 921 may provide the assisting torque to the user based on the optimal assisting torque profile extracted from the level walking task 911. Also, the walking assistance apparatus 100, 921 may measure the hip-joint angle or the hip-joint angular velocity and extract the optimal gain by adjusting the gain of the driving portion, thereby setting the optimal gain based on the gain of the driving portion.

At a point 933, the level walking task 911 may be changed to the stepping-down task 915 such that the hip-joint angle or the hip-joint angular velocity of the user performing the gait is to be greater than or equal to the desired (or, alternatively, the predetermined) threshold range. In this example, the walking assistance apparatus 100, 921 may measure the hip-joint angle or the hip-joint angular velocity and extract the optimal gain by adjusting the gain of the driving portion based on a result of the measuring, thereby setting the optimal gain based on the gain of the driving portion.

Figure 10:
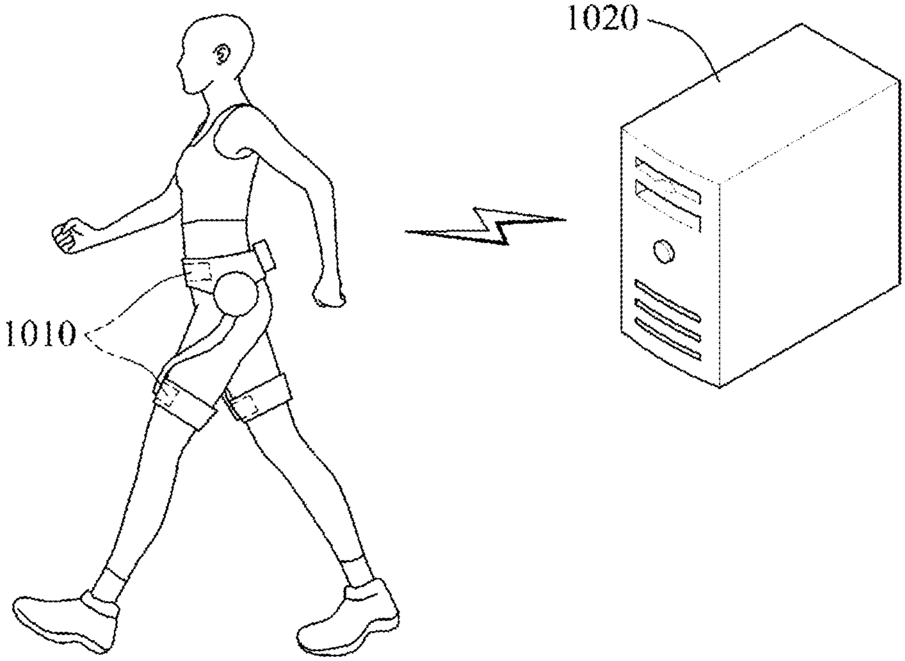
FIG. 10 illustrates an example of setting an optimal assisting torque according to example embodiments.

FIG. 10 illustrates an example of setting an optimal assisting torque according to example embodiments.

Referring to FIG. 10, an assisting torque setting apparatus 200, 1020 may be configured to be separate from a walking assistance apparatus 100, 1010. The assisting torque setting apparatus 1020 may extract body information of a user in advance, and generate a reference gait model by applying the body information to a desired (or, alternatively, a predetermined) body model. The assisting torque setting apparatus 200, 1020 may generate an initial assisting torque profile indicating a change trajectory of an assisting torque based on a desired (or, alternatively, a predetermined) period of time, and extract an optimal assisting torque profile for minimizing an MCOT by adjusting the change trajectory.

The assisting torque setting apparatus 200, 1020 may transmit the extracted optimal assisting torque profile to the walking assistance apparatus using a communication interface. The walking assistance apparatus 100, 1010 may provide the assisting torque to the user in response to the optimal assisting torque received from the assisting torque setting apparatus 200, 1020.

In an example, the walking assistance apparatus 100, 1010 may measure at least one of a hip-joint angle and a hip-joint angular velocity of the user during a gait in real time. The walking assistance apparatus 100, 1010 may transmit at least one of the measured hip-joint angle and hip-joint angular velocity to the assisting torque setting apparatus 200, 1020. Based on the reference gait model, the assisting torque setting apparatus 200, 1020 may adjust a gain of a driving portion outputting an assisting torque corresponding to at least one of the hip-joint angle and the hip-joint angular received from the walking assistance apparatus 100, 1010, thereby extracting an optimal gain minimizing the MCOT. The assisting torque setting apparatus 200, 1020 may transmit the extracted optimal gain to the walking assistance apparatus 100, 1010, and the walking assistance apparatus 100, 1010 may set the gain of the driving portion based on the optimal gain.

Figure 11:
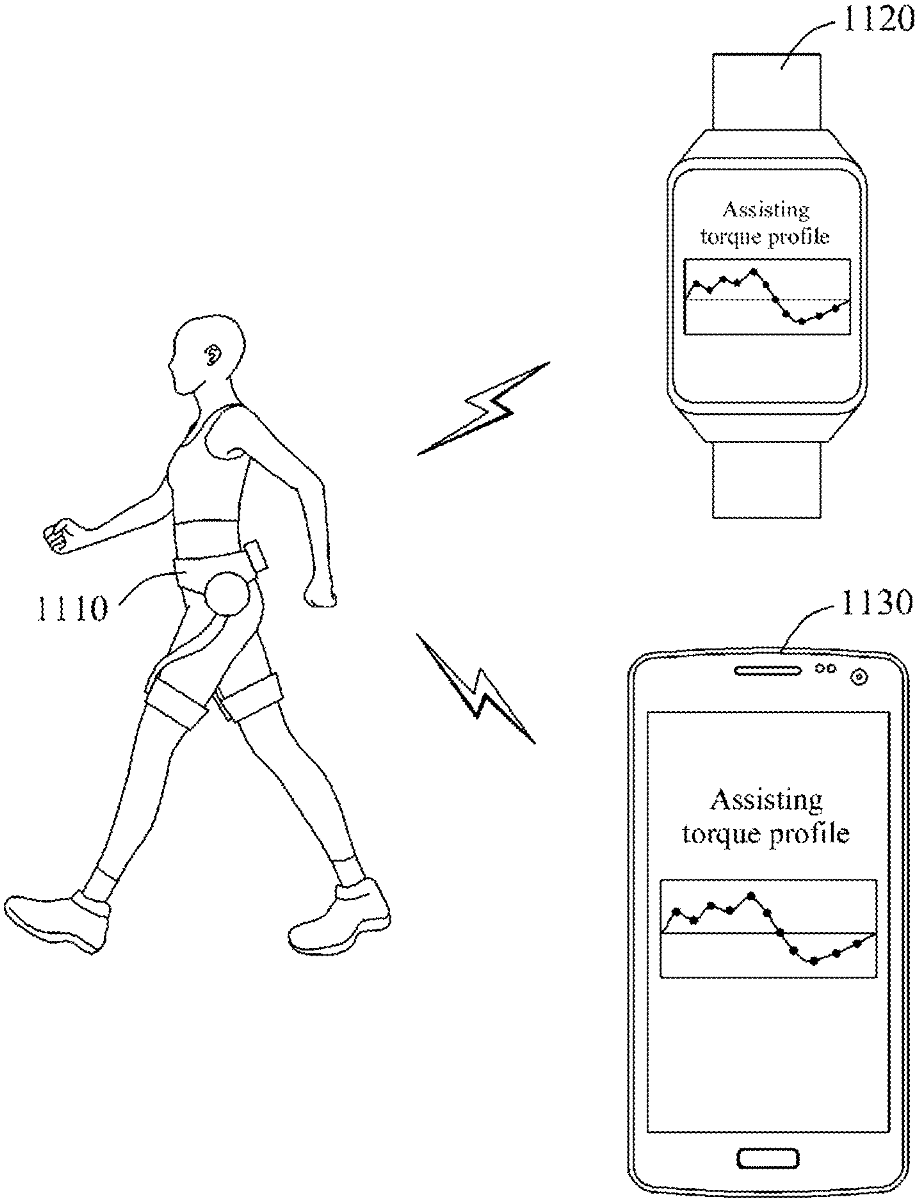
FIG. 11 illustrates an example of an interface for providing an optimal assisting torque profile according to example embodiments.

FIG. 11 illustrates an example of an interface for providing an optimal assisting torque profile according to example embodiments.

Referring to FIG. 11, a walking assistance apparatus 1110 may receive a reference gait model from an external apparatus using a communication interface. The reference gait model may be stored in the external apparatus by applying body information of a user to a desired (or, alternatively, a predetermined) body model. Also, using the reference gait model, the walking assistance apparatus 1110 may generate an initial assisting torque profile indicating a change trajectory of an assisting torque based on a desired (or, alternatively, a predetermined) period of time, and adjust the change trajectory. The walking assistance apparatus 1110 may extract a variation of an MCOT based on the adjusted change trajectory, and determine whether the MCOT is a minimized value based on the extracted variation of the MCOT. When the MCOT is determined not to be the minimized value, the walking assistance apparatus 1110 may repetitively adjust the change trajectory until the MCOT is minimized. When the MCOT is determined to be the minimized value, the walking assistance apparatus 1110 may set the change trajectory corresponding to the minimized value of the MCOT as an optimal change trajectory, and generate the optimal assisting torque profile based on the optimal change trajectory Also, the walking assistance apparatus 1110 may communicate with a wearable apparatus 1120 and/or a mobile terminal 1130 using the communication interface. For example, when the walking assistance apparatus 1110 extracts the optimal assisting torque profile, the walking assistance apparatus 1110 may transmit information associated with the optimal assisting torque profile to the wearable apparatus 1120 or the mobile terminal 1130. The wearable apparatus 1120 or the mobile terminal 1130 may display the optimal assisting torque profile received from the walking assistance apparatus 1110.

Figure 12:
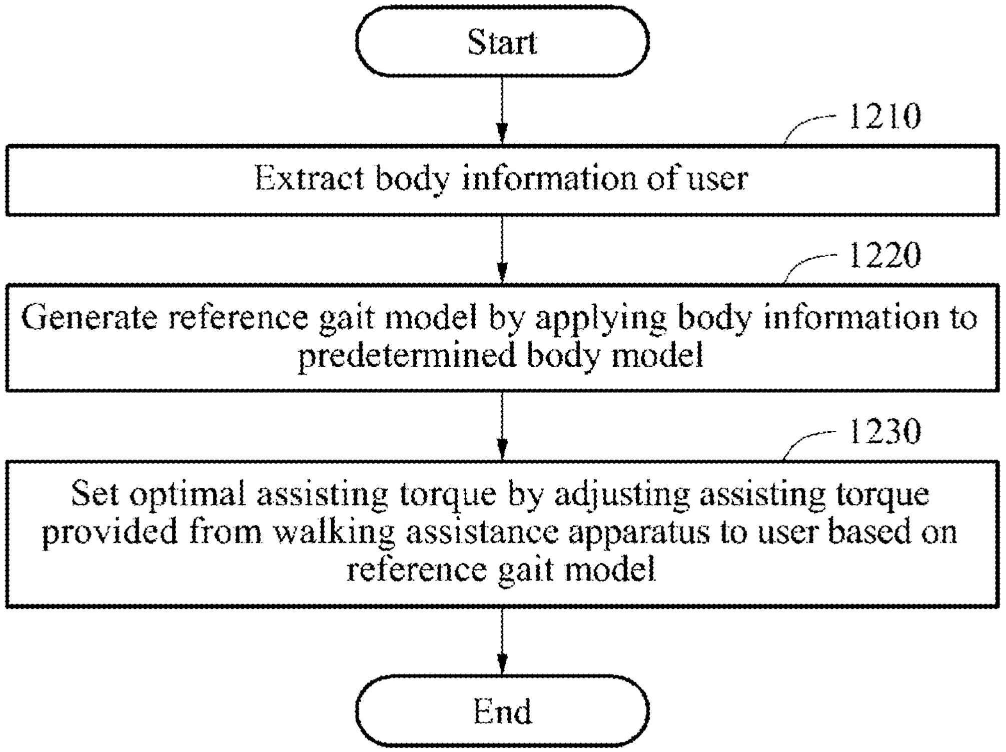
FIG. 12 illustrates an example of an assisting torque setting method according to example embodiments.

FIG. 12 illustrates an example of an assisting torque setting method according to example embodiments.

Referring to FIG. 12, in operation 1210, an assisting torque setting apparatus extracts body information of a user.

In operation 1220, the assisting torque setting apparatus 200 generates a reference gait model by applying the body information to a desired (or, alternatively, a predetermined) body model.

In operation 1230, the assisting torque setting apparatus 200 sets an optimal assisting torque by adjusting an assisting torque provided from a walking assistance apparatus to the user based on the reference gait model.

Since the descriptions provided with reference to FIGS. 1A through 1I are also applicable here, repeated descriptions with respect to the assisting torque setting method of FIG. 12 will be omitted for increased clarity and conciseness.

Figure 13:
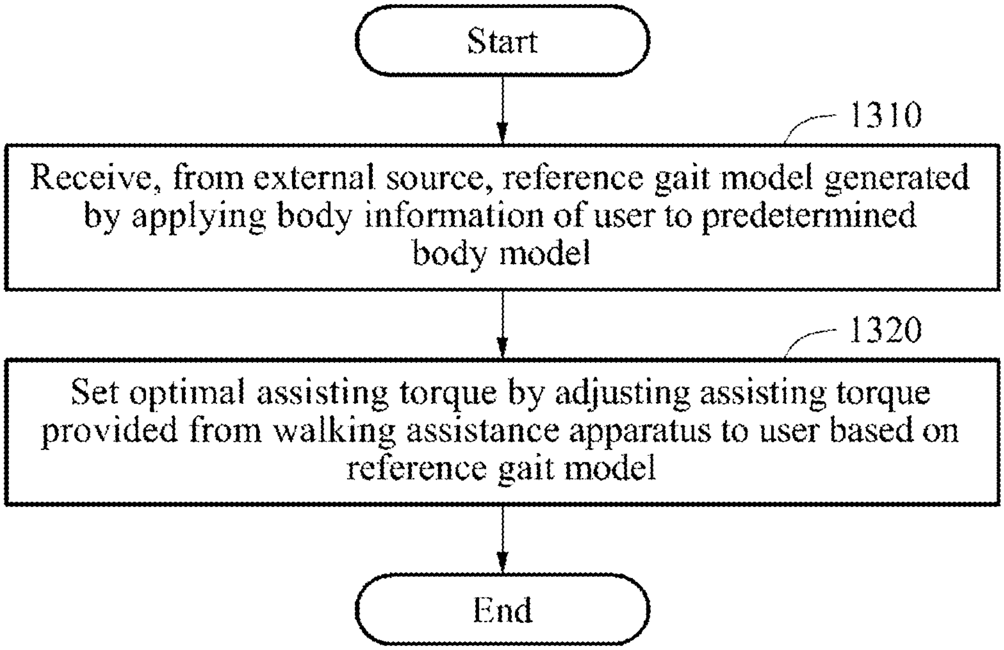
FIG. 13 illustrates another example of an assisting torque setting method according to example embodiments.

FIG. 13 illustrates another example of a walking assistance method according to example embodiments.

Referring to FIG. 13, in operation 1310, the walking assistance apparatus 100 receives, from an external source, a reference gait model generated by applying body information of a user to a desired (or, alternatively, a predetermined) body model.

In operation 1320, the walking assistance apparatus 100 sets an optimal assisting torque by adjusting an assisting torque provided from the walking assistance apparatus to the user based on the reference gait model.

Since the descriptions provided with reference to FIGS. 1A through 12 are also applicable here, repeated descriptions with respect to the walking assistance method of FIG. 13 will be omitted for increased clarity and conciseness.

The units and/or modules described herein may be implemented using hardware components and software components. For example, the hardware components may include microphones, amplifiers, band-pass filters, audio to digital convertors, and processing devices.

For example, one or more of the controller 140 and a controller associated with the assisting torque setting apparatus 200 may include a processor and a memory (not shown). The controller may include a processor, for example, a central processing unit (CPU), a controller, or an application-specific integrated circuit (ASIC), that when, executing instructions stored in the memory, configures one or more of the controller 140 and a controller (not shown) associated with the assisting torque setting apparatus 200 as a special purpose machine to perform the operations illustrated in one or more of FIGS. 4, 5, 12 and 13. For example, the controller may be configured to set the assistance torque provided by driving portion 110 to the user based on a reference gait model. In some example embodiments, the controller may generate the reference gait model by applying body information associated with the user to a body model. In other example embodiments, the controller may receive the reference gait model, and set the assistance torque based on the received reference gait model. In at least some example embodiments, the controller may set the assistance torque provided by the driving portion to an optimal assistance torque such that the assistance torque minimizes the amount of energy exerted by the user when performing a walking operation.

For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electronic device comprising:
- a memory configured to store a program to generate an assisting torque profile for a user; and
- a processor configured to execute the program to:
  - obtain body information including a height and a weight of the user,
  - generate an initial assisting torque profile based on the body information,
  - generate a first assisting torque profile by adjusting a trajectory of the initial assisting torque profile to reduce an amount of metabolic energy used for a gait of the user, and
  - output, on a display of the electronic device, the first assisting torque profile as a series of points, the series of points each indicating an assisting torque provided from a walking assistance apparatus at a corresponding time associated with the gait of the user such that the series of points together form a trajectory of the assisting torque provided from the walking assistance apparatus.

2. The electronic device of claim 1, wherein the processor is further configured to execute the program to:
- generate a gait model by applying the body information to a body model; and
- generate the initial assisting torque profile through the gait model generated based on the body information.

3. The electronic device of claim 1, wherein the processor is further configured to execute the program to:
- output the trajectory of the initial assisting torque profile on the display of the electronic device.

4. The electronic device of claim 1, wherein the processor is further configured to execute the program to:
- set the assisting torque provided from the walking assistance apparatus to the user based on the first assisting torque profile.

5. The electronic device of claim 1, wherein the initial assisting torque profile is an initial series of points that each indicate an initial assisting torque provided from the walking assistance apparatus at a corresponding time within a single step within a gait task, the series of points together forming the trajectory of the initial assisting torque during the single step.

6. The electronic device of claim 5, wherein the processor is further configured to execute the program to:
- adjust the trajectory of the initial assisting torque profile by, for at least one of the points, increasing or decreasing the initial assisting torque associated therewith based on the gait task to generate the first assisting torque profile.

7. The electronic device of claim 1, wherein the processor is further configured to execute the program to:
- determine the amount of metabolic energy used for the gait of the user by calculating a metabolic cost of transport (MCOT) associated with the user.

8. The electronic device of claim 7, wherein the processor is further configured to execute the program to:
- calculate the MCOT based on a force used in a muscle of the user during the gait, a moving velocity of the muscle, a moving distance of the user, and a mass of the muscle.

9. The electronic device of claim 7, wherein the processor is further configured to execute the program to:
- adjust the trajectory until the MCOT is minimized.

10. The electronic device of claim 7, wherein the processor is further configured to execute the program to:
- determine a variation of the MCOT in response to the processor adjusting the trajectory.

11. The electronic device of claim 1, wherein the electronic device is a wearable apparatus or a mobile terminal.

12. A method of generating an assisting torque profile, the method performed by an electronic device, the method comprising:
- obtaining body information including a height and a weight of a user;
- generating an initial assisting torque profile based on the body information;
- generating a first assisting torque profile by adjusting a trajectory of the initial assisting torque profile to reduce an amount of metabolic energy used for a gait of the user; and
- outputting, on a display of the electronic device, the first assisting torque profile as a series of points, the series of points each indicating an assisting torque provided from a walking assistance apparatus at a corresponding time associated with the gait of the user such that the series of points together form a trajectory of the assisting torque provided from the walking assistance apparatus.

13. The method of claim 12, wherein the electronic device is a wearable apparatus or a mobile terminal.

14. A non-transitory computer-readable storage medium storing instructions that, when executed by a processor, cause the processor to perform the method of claim 12.

15. An electronic device comprising:
- a memory configured to store a program to generate an assisting torque profile for a user; and
- a processor configured to execute the program to:
  - obtain body information of the user,
  - generate an initial assisting torque profile through a reference gait model generated based on the body information,
  - generate a first assisting torque profile by adjusting a trajectory of the initial assisting torque profile to reduce an amount of metabolic energy used for a gait of the user, and output the first assisting torque profile as a series of points on a display of the electronic device, the series of points each indicating an assisting torque provided from a walking assistance apparatus at a corresponding time associated with the gait of the user such that the series of points together form a trajectory of the assisting torque provided from the walking assistance apparatus.

16. The electronic device of claim 15, wherein the assisting torque provided from the walking assistance apparatus is configured to assist the user with performing a gait task, and the processor is configured to adjust the trajectory of the initial assisting torque profile by increasing or decreasing the assisting torque associated therewith based on the gait task to generate the first assisting torque profile.

17. The electronic device of claim 16, wherein the processor is configured to adjust the trajectory of the initial assisting torque profile to generate the first assisting torque profile by increasing or decreasing at least one point included in an initial series of points forming the first assisting torque profile.

* * * * *